(12) United States Patent
Matsuda et al.

(10) Patent No.: US 10,723,638 B2
(45) Date of Patent: Jul. 28, 2020

(54) LIQUID TREATMENT DEVICE

(71) Applicant: Panasonic Intellectual Property Management Co., Ltd., Osaka (JP)

(72) Inventors: Genichiro Matsuda, Nara (JP); Takahiro Kitai, Hyogo (JP); Gaku Miyake, Osaka (JP); Yoshio Yamada, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 65 days.

(21) Appl. No.: 16/190,667

(22) Filed: Nov. 14, 2018

(65) Prior Publication Data

US 2019/0169051 A1  Jun. 6, 2019

(30) Foreign Application Priority Data

Dec. 1, 2017  (JP) .................. 2017-231766

(51) Int. Cl.
*C02F 1/46* (2006.01)
*B01J 19/00* (2006.01)
(Continued)

(52) U.S. Cl.
CPC ........ *C02F 1/4608* (2013.01); *C02F 1/46109* (2013.01); *B01J 2219/0894* (2013.01);
(Continued)

(58) Field of Classification Search
CPC ....... B01J 7/00; B01J 7/02; B01J 19/00; B01J 19/26; B01J 2219/00; B01J 2219/08; B01J 2219/0894; H05H 1/00; H05H 1/0006; H05H 1/0081; C02F 1/00; C02F 1/46; C02F 1/4608; C02F 1/461–46109; C02F 2001/46133; C02F 2001/46152;
(Continued)

(56) References Cited

U.S. PATENT DOCUMENTS 6,200,466 B1  3/2001  Bender
6,228,266 B1  5/2001  Shim
(Continued)

FOREIGN PATENT DOCUMENTS

JP  2000-093967  4/2000
JP  2003-113476  4/2003
(Continued)

*Primary Examiner* — Natasha E Young
(74) *Attorney, Agent, or Firm* — Wenderoth, Lind & Ponack, L.L.P.

(57) ABSTRACT

A liquid treatment device includes a rod-shaped first electrode; a plate-shaped second electrode configured from a metal containing copper or iron; and a treatment vessel in which introduced liquid swirls, and generates a gas phase in a swirl flow of the liquid. A plasma is generated by applying a pulse voltage to the generated gas phase, and a negative DC voltage is applied between the first electrode and the second electrode serving as a cathode and an anode, respectively. Under the applied negative voltage, the plate-like second electrode generates copper ions or iron ions, and the copper or iron ions undergo Fenton's reaction with the hydrogen peroxide generated by the plasma so that liquid can be efficiently treated.

5 Claims, 13 Drawing Sheets

(51) Int. Cl.
  *B01J 19/26* (2006.01)
  *H05H 1/00* (2006.01)
  *C02F 1/461* (2006.01)

(52) U.S. Cl.
  CPC ........... *C02F 2001/46133* (2013.01); *C02F 2001/46171* (2013.01); *C02F 2201/4617* (2013.01); *C02F 2201/46135* (2013.01); *C02F 2201/46175* (2013.01); *C02F 2303/04* (2013.01); *C02F 2305/023* (2013.01); *C02F 2305/026* (2013.01)

(58) Field of Classification Search
  CPC ........ C02F 2001/46171; C02F 2201/00; C02F 2201/46; C02F 2201/461; C02F 2201/4612; C02F 2201/46125; C02F 2201/46135; C02F 2201/4616; C02F 2201/4617; C02F 2201/46175; C02F 2303/00; C02F 2303/02; C02F 2303/04; C02F 2305/00; C02F 2305/02; C02F 2305/023; C02F 2305/026
  See application file for complete search history.

(56) References Cited

U.S. PATENT DOCUMENTS

| | | | |
|---|---|---|---|
| 9,661,732 B2 * | 5/2017 | Imai | ............ H05H 1/48 |
| 2003/0209450 A1 | 11/2003 | McVey et al. | |
| 2003/0230567 A1 | 12/2003 | Centanni et al. | |

FOREIGN PATENT DOCUMENTS

| | | | |
|---|---|---|---|
| JP | 2003-521710 | 7/2003 | |
| JP | 2007-534132 | 11/2007 | |
| JP | 2010-194379 | 9/2010 | |
| JP | 2013-138990 | 7/2013 | |
| JP | 2013-170844 | 9/2013 | |
| JP | 2014-113517 | 6/2014 | |
| JP | 2016083658 A * | 5/2016 | ............ H05H 1/48 |

* cited by examiner

LIQUID TREATMENT DEVICE

This application claims foreign priority to Japanese Patent Application No. JP 2017-231766, filed on Dec. 1, 2017.

TECHNICAL FIELD

The technical field relates to a liquid treatment device that electrochemically treats liquid. Specifically, the present disclosure relates to a liquid treatment device that treats liquid with a plasma generated in the liquid, whereby contaminants and microorganisms contained in the liquid are decomposed and sterilized by the plasma directly contacting these substances, and simultaneously by the ultraviolet (UV) light and radicals generated by plasma discharge.

BACKGROUND

FIG. 10 shows a traditional liquid treatment device. A first electrode 801 and a second electrode 802 are disposed in liquid 803 (for example, water), and a pulse power supply 804 applies a high-voltage pulse across the electrodes 801 and 802 to vaporize the liquid 803 and generate a plasma 805. Here, contaminants and other foreign substances contained in the liquid 803 are decomposed as the plasma directly contacts the liquid 803. Simultaneously, for example, highly oxidative components, such as hydroxyl radicals (OH radicals) and hydrogen peroxide, are generated and decompose contaminants and other foreign substances contained in the liquid 803 by reacting with these substances. Among the radicals that occur as a result of plasma generation in the liquid 803, OH radicals are known to have particularly high oxidative power, and enable decomposition of persistent organic compounds dissolved in the liquid 803.

A problem of the traditional liquid treatment device, however, is that a high voltage needs to be applied to vaporize the liquid, and the liquid treatment takes a long time because of the poor plasma generation efficiency.

As a technique to improve plasma generation efficiency with low applied voltage, a liquid treatment device is known that incorporates externally introduced gas between electrodes (see JP-A-2000-093967). In the liquid treatment device of this related art (see FIG. 11), a pulse voltage is applied between an anode electrode 901 and a rod-like cathode electrode 902 with a liquid to be treated 903 and a gas 904 (for example, oxygen) being present between these electrodes. The applied pulse voltage generates a plasma in the gas 904, and decomposition takes place at the plasma surface contacting the liquid to be treated 903. The liquid treatment described in JP-A-2000-093967 enables use of a smaller applied voltage than when gas is absent, and efficiently generates a plasma for liquid treatment.

However, the OH radicals that are generated in such a liquid treatment device are very reactive, and the life is short as they quickly turn into relatively stable hydrogen peroxide. Hydrogen peroxide is known to generate OH radicals by reaction with metals such as copper and iron, or the Fenton's reaction as it is commonly called. The formula (1) below represents a Fenton's reaction with copper ions, in which OH radicals generate as monovalent copper ions react with hydrogen peroxide and turn into divalent copper ions. The divalent copper ions are known to react with hydrogen peroxide to simultaneously produce monovalent copper ions, as represented by formula (2). Formulae (3) and (4) represent Fenton's reactions with iron ions, which simultaneously take place, and produce OH radicals from divalent iron ions, and divalent iron ions from trivalent iron ions. That is, metal ions are known to undergo catalytic reaction in the Fenton's reaction.

$$Cu^+ + H_2O_2 \rightarrow Cu^{2+} + \cdot OH + OH^- \quad (1)$$

$$Cu^{2+} + H_2O_2 \rightarrow Cu^+ + HO_2 \cdot + H^+ \quad (2)$$

$$Fe^{2+} + H_2O_2 \rightarrow Fe^{3+} + \cdot OH + OH^- \quad (3)$$

$$Fe^{3+} + H_2O_2 \rightarrow Fe^{2+} + HO_2 \cdot + H^+ \quad (4)$$

A liquid treatment device is known that, by taking advantage of the Fenton's reaction, improves treatment performance by regenerating OH radicals from the altered hydrogen peroxide (see JP-A-2013-138990). In the liquid treatment device of this related art (see FIG. 12), at least one of the electrodes 64 and 65 is configured from metals containing copper or iron. Because of this configuration, applying a voltage to the pair of electrodes 64 and 65 from a high voltage generator 70 causes electrolysis, simultaneously with plasma generation in water. This causes the copper or iron to dissolve out of the electrodes, and produces copper ions or iron ions. These copper ions or iron ions undergo the Fenton's reaction in the water being treated, whereby the copper ions or iron ions react with the hydrogen peroxide produced from OH radicals or other chemical species generated by a plasma, and produce OH radicals. The OH radicals can then react with the organic materials or other substances contained in the water being treated, and the treatment performance of the liquid treatment device can improve.

The liquid treatment device described in JP-A-2000-093967 uses a rod-like positive electrode. The reason for using a rod-like electrode as the positive electrode is that the discharge between a rod-like electrode and a plate electrode occurs more easily, and the energy efficiency improves when a positive voltage is applied to the rod-like electrode. The Fenton's reaction can take place also in such a liquid treatment device when the electrodes use copper- or iron-containing metals as in JP-A-2013-138990.

However, because the metal ions dissolve out of the rod-like positive electrode through electrolysis, the electrode severely wears out, and the life of the rod-like electrode is considerably cut short after a long treatment. In the end, the device is no longer able to stably generate plasma. That is, the system cannot operate for extended time periods.

SUMMARY OF THE INVENTION

Under the circumstances discussed above, the present disclosure is intended to provide a liquid treatment device that can efficiently generate plasma for liquid treatment while at the same time improving treatment performance by taking advantage of the Fenton's reaction, and that enables stable plasma generation for a prolonged time period.

A liquid treatment device according to an aspect of the present disclosure includes:

a treatment vessel that is cylindrical in shape and having a circular cross section and a closed end;

a first electrode that is rod-like in shape and is disposed at a first end on a central axis of the treatment vessel;

a second electrode made of a copper or iron-containing metal and disposed at a second end of the treatment vessel;

a pulse power supply that applies a positive pulse voltage between the first electrode and the second electrode with the first electrode serving as an anode;

a DC power supply that applies a negative voltage between the first electrode and the second electrode with the second electrode serving as an anode; and a liquid inlet through which liquid is introduced in a tangential direction of the circular cylindrical shape of the treatment vessel, and that causes the liquid to swirl in the treatment vessel and generate a gas phase in a swirl flow of the liquid.

With the liquid treatment device of the aspect of the present disclosure, the second electrode can serve as an anode and produce metal ions under the negative voltage applied between the first electrode and the second electrode by the DC power supply. For example, by making metal ions dissolve out from the plate-like second electrode through electrolysis, wears on the rod-like first electrode can be reduced, and a plasma can be efficiently generated for liquid treatment while at the same time improving treatment performance by taking advantage of the Fenton's reaction. This also enables stable plasma generation for a prolonged time period, and the system can operate for extended time periods. Because there is no need to vaporize liquid by voltage application, a plasma can be generated with a small power, and the liquid can be efficiently treated.

DESCRIPTION OF EMBODIMENTS

Embodiment

Figure 1:
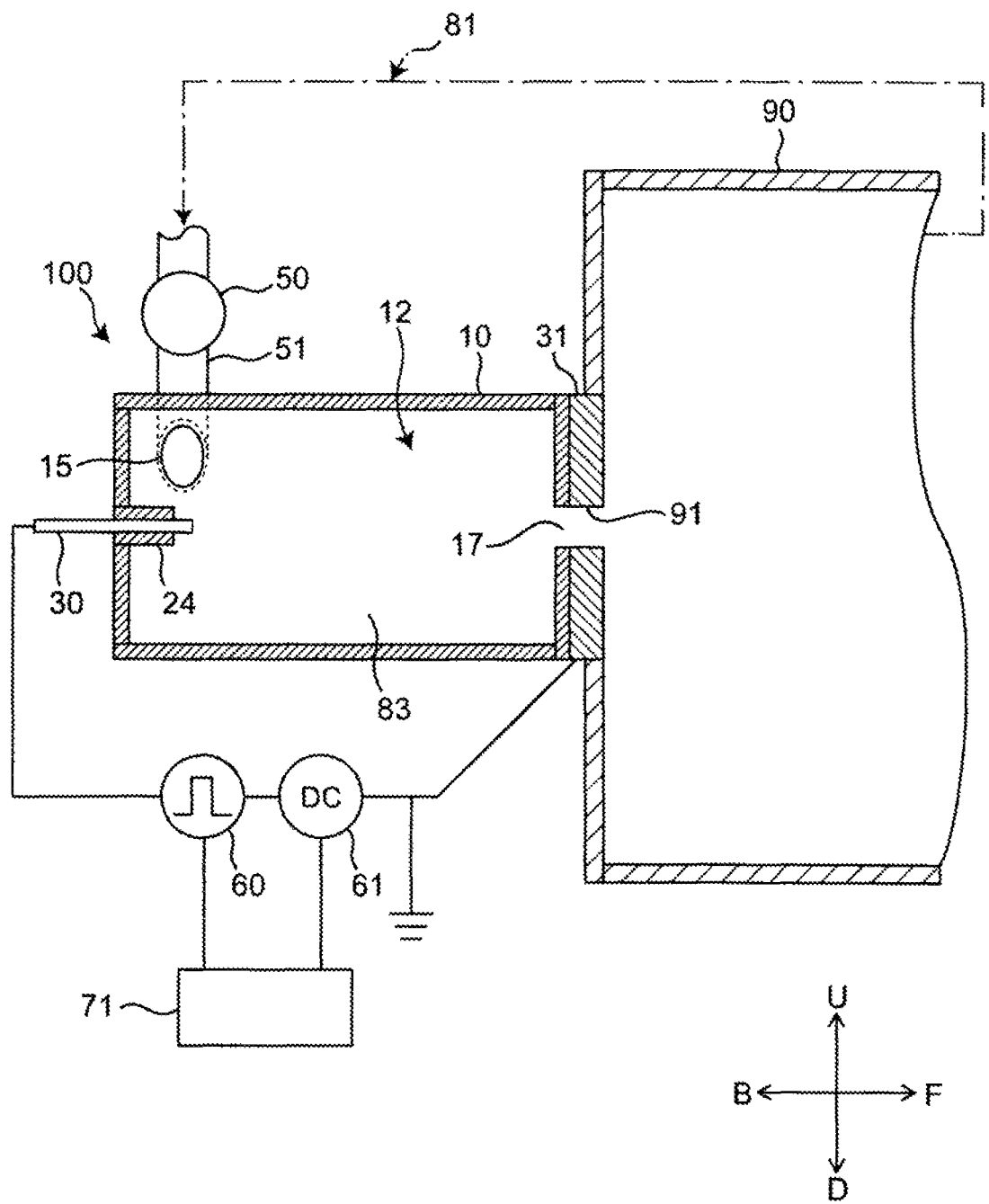
FIG. 1 is a side cross sectional view showing a configuration of a liquid treatment device according to an embodiment of the present disclosure.

A liquid treatment device 100 according to an embodiment of the present disclosure is described below in detail, with reference to the accompanying drawings. In the drawings, the same or corresponding features are referred to by using the same reference numerals, and the same descriptions will not be repeated. To help understand the descriptions, the configurations in the drawings referred to in the following descriptions may be shown in simplified or schematic forms, or with omission of some of the constituting members. The dimensional ratios of the constituting members shown in the drawings are not necessarily true to the actual dimensional ratios.

Overall Configuration

The overall configuration of the liquid treatment device 100 is described first. FIG. 1 is a side cross sectional view showing a configuration of the liquid treatment device 100 according to First Embodiment of the present disclosure. In the diagrams referred to below, the arrow F represents the front of the liquid treatment device 100, and arrow B represents the back of the liquid treatment device 100. Arrow U represents the top of the liquid treatment device 100, and arrow D represents the bottom of the liquid treatment device 100. Arrow R represents the right as viewed from the back, and arrow L represent the left as viewed from the back.

FIG. 1 shows the liquid treatment device 100 connected to a reservoir 90. The liquid treatment device 100 and the reservoir 90 together may represent a liquid treatment system. The liquid treatment device 100 treats liquid by discharging in the liquid. The present embodiment will be described through the case of treating an aqueous solution containing contaminants. The reservoir 90 stores a treated liquid L2 treated in the liquid treatment device 100.

The liquid treatment device 100 includes at least a treatment vessel 12, a first electrode 30, a second electrode 31, a pulse power supply 60, and a direct-current (DC) power supply 61. More specifically, the liquid treatment device 100 includes a device main body 10, a liquid supply section 50, the pulse power supply 60, and the DC power supply 61. The device main body 10 includes the treatment vessel 12, an inlet portion 15 serving as an example of a liquid inlet, an ejecting section 17, the first electrode 30, and the second electrode 31.

The treatment vessel 12 is where the introduced liquid (for example, water) is treated. The treatment vessel 12 has a cylindrical treatment chamber having a circular front cross section. The inlet portion 15 is disposed at one end of the treatment vessel 12, and the ejecting section 17 is disposed at the other end of the treatment vessel 12. Liquid is introduced into the treatment vessel 12 through the inlet portion 15. The inlet portion 15 is in communication with the liquid supply section 50 via a pipe 51. The treated liquid L2 treated in the treatment vessel 12 is ejected from the treatment vessel 12 through the ejecting section 17. In the present embodiment, the ejecting section 17 is connected to an intake opening 91 of the reservoir 90. The treated liquid L2 ejected through the ejecting section 17 enters the reservoir 90 through the intake opening 91, and is stored in the reservoir 90. The material of the treatment vessel 12 may be an insulator or a conductor. In the case of a conductor, the treatment vessel 12 must be separated from the electrodes 30 and 31 via an insulator.

The first electrode 30 is rod-like in shape, and is disposed in the treatment vessel 12. The first electrode 30 is disposed via, for example, an insulating section on the wall surface opposite the wall surface where the ejecting section 17 of the treatment vessel 12 is formed.

The liquid treatment device may include a control unit (controller) 71. Under the control of the control unit 71, the high pulse-voltage of the pulse power supply 60, and the negative offset voltage of the DC power supply 61 are applied across the first electrode 30 and the second electrode 31. The timing of voltage application will be described later.

The second electrode 31 is disposed in the vicinity of the ejecting section 17. The second electrode 31 is made of a copper- or iron-containing metal. As an example, in FIG. 1, the second electrode 31 is fixed to the outer wall of the treatment vessel 12 where the ejecting section 17 is formed, specifically, the wall surface of the reservoir 90 adjacent the treatment vessel 12.

The first electrode 30 is connected to the pulse power supply 60, and serves as an anode. The second electrode 31 is grounded. Under the control of the control unit 71, the high pulse-voltage of the pulse power supply 60, and the negative offset voltage of the DC power supply 61 can be applied to the first electrode 30 and the second electrode 31.

The liquid supply section 50 is, for example, a pump that supplies a liquid (for example, water) L1 into the treatment vessel 12. The liquid supply section 50 is connected to the pipe 51. At one end, the pipe 51 is connected to the inlet portion 15. The other end of the pipe 51 is connected to a liquid source (for example, a water tank or a faucet; not illustrated). Alternatively, the other end of the pipe 51 is connected to the reservoir 90 so as to circulate a liquid (liquid to be treated L3) containing the treated liquid L2 sent from the liquid treatment device 100 and stored in the reservoir 90.

The pulse power supply 60 applies a positive high pulse-voltage of several kilovolts between the first electrode 30 and the second electrode 31.

The DC power supply 61 applies a negative offset voltage of about 1 to 100 V between the first electrode 30 and the second electrode 31.

The pulse power supply 60 may apply a bipolar pulse voltage by alternately applying a positive pulse voltage and a negative pulse voltage. However, the energy efficiency is higher when a monopolar pulse voltage is applied by applying only a positive pulse voltage. In the case where a bipolar voltage is applied, electrolysis occurs, and metal ions dissolve out while a negative pulse voltage is applied. However, the amount of dissolved metal ions is small because of the short time of negative pulse voltage application, and the Fenton's reaction does not sufficiently take place. It is accordingly necessary to apply a negative offset voltage between the first electrode 30 and the second electrode 31 from the DC power supply 61 also when applying a bipolar voltage.

Device Main Body

Figure 2:
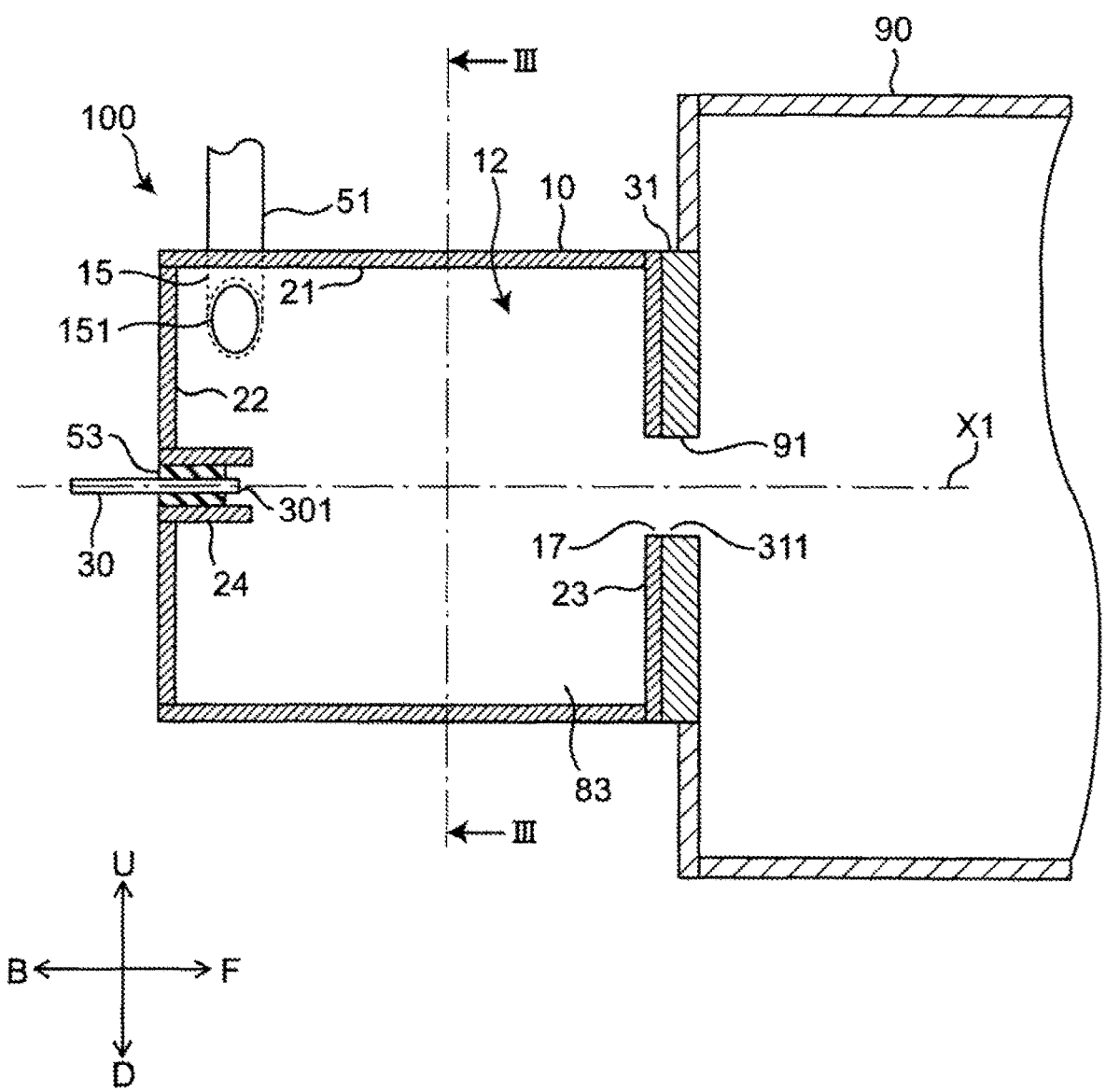
FIG. 2 is a side cross sectional view of a device main body.

The device main body 10 is described below in detail. FIG. 2 is a side cross sectional view of the device main body 10.

The treatment vessel 12 has a first inner wall 21, a second inner wall 22, and a third inner wall 23. The first inner wall 21 is a cylindrical wall portion. The second inner wall 22 is provided at a first end portion of the first inner wall 21 (for example, the left end portion of FIG. 2). The third inner wall 23 is provided at a second end portion of the first inner wall 21 (for example, the right end portion of FIG. 2). The second inner wall 22 and the third inner wall 23 are substantially circular in shape as viewed from side. The first inner wall 21, the second inner wall 22, and the third inner wall 23 form a substantially cylindrical housing 83 inside the treatment vessel 12. Here, the first inner wall 21 has a central axis X1, that is, an imaginary central axis of the substantially cylindrical housing 83 formed inside the treatment vessel 12.

The second inner wall 22 has an electrode supporting tube 24 projecting out into the treatment vessel 12 from the center of the second inner wall 22. The electrode supporting tube 24 is tubular in shape, and extends toward the third inner wall 23 (i.e., toward the right in FIG. 2). The electrode supporting tube 24 is disposed in such an orientation that its central axis lies on the central axis X1. The first electrode 30 is supported in the electrode supporting tube 24, via an insulator 53. The first electrode 30, which is rod-like in shape, is surrounded by the insulator 53 having a form of a tube. The first electrode 30 is disposed in such an orientation that its longitudinal axis lies on the central axis X1. The inner end portion of the first electrode 30 projects out toward the third inner wall 23 (i.e., toward the right in FIG. 2) by about the same length as the electrode supporting tube 24, past the insulator 53.

Figure 3:
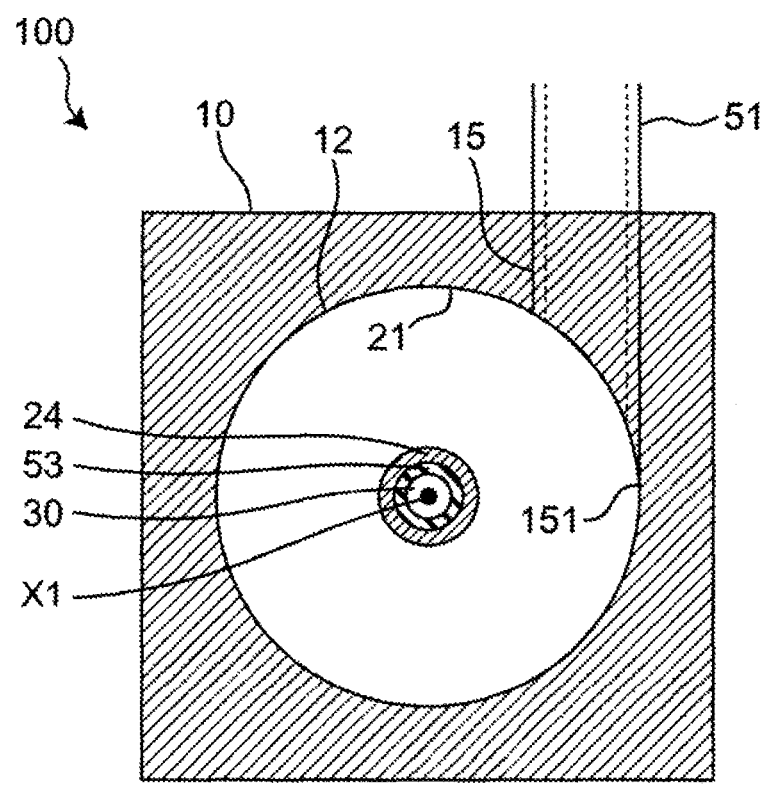
FIG. 3 is a cross sectional view at line III-III of FIG. 2.
Figure 3:
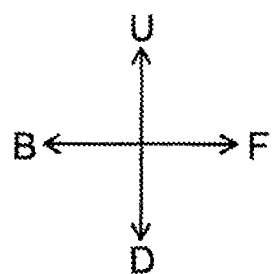

The inlet portion 15 is provided through the device main body 10, and has an open end 151 formed in the first inner wall 21. The inlet portion 15 is disposed at a location adjacent the second inner wall 22 as viewed from side. FIG. 3 is a cross sectional view at line III-III of FIG. 2. The inlet portion 15 is disposed in the surface of the first inner wall 21.

The ejecting section 17 is provided through, for example, a central portion of the third inner wall 23. The ejecting section 17 is formed in such a fashion that its central axis lies on the central axis X1.

The second electrode 31 is a copper or iron-containing plate-like metallic member, and has an opening 311 formed through its central portion. The opening 311 is circular in shape, and is formed in such a fashion that its central axis lies on the central axis X1.

Operation

The operation of the liquid treatment device 100 is described below.

Figure 4:
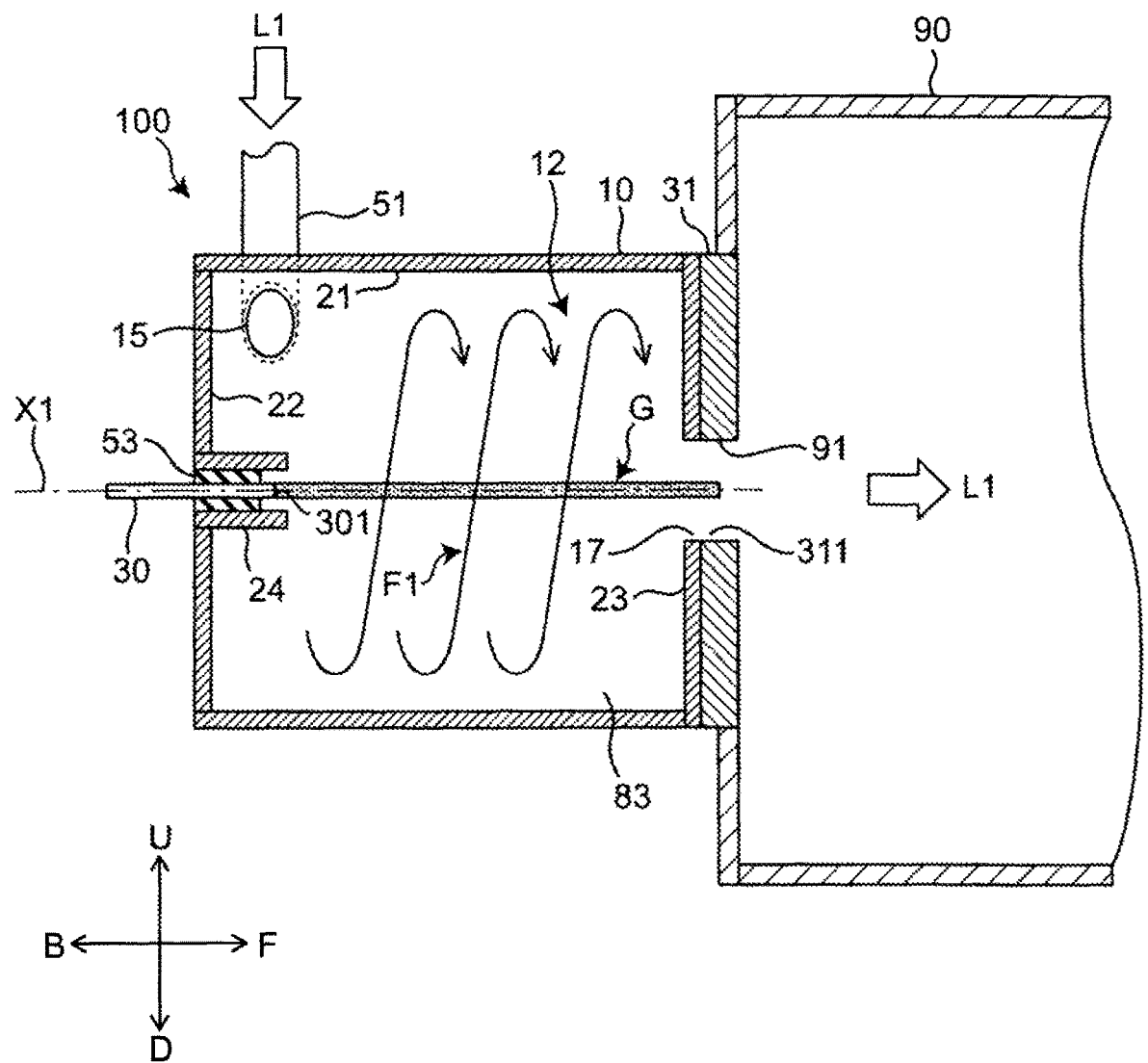
FIG. 4 is a side cross sectional view showing a swirl flow that has generated in the treatment vessel, in the absence of an applied voltage.
Figure 5A:
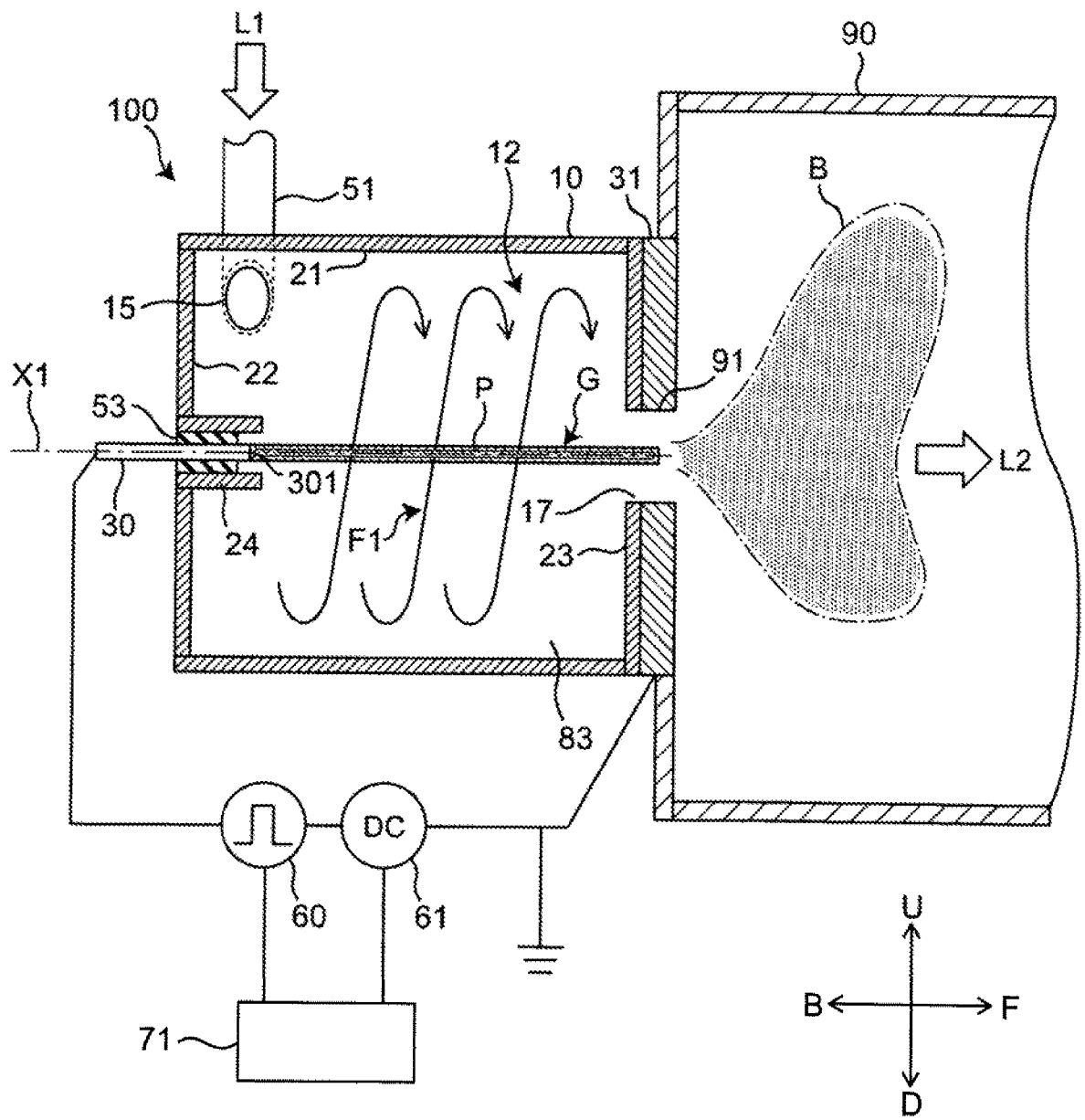
FIG. 5A is a side cross sectional view showing a swirl flow that has generated in the treatment vessel, along with a plasma generated by applying a pulse voltage.
Figure 5B:
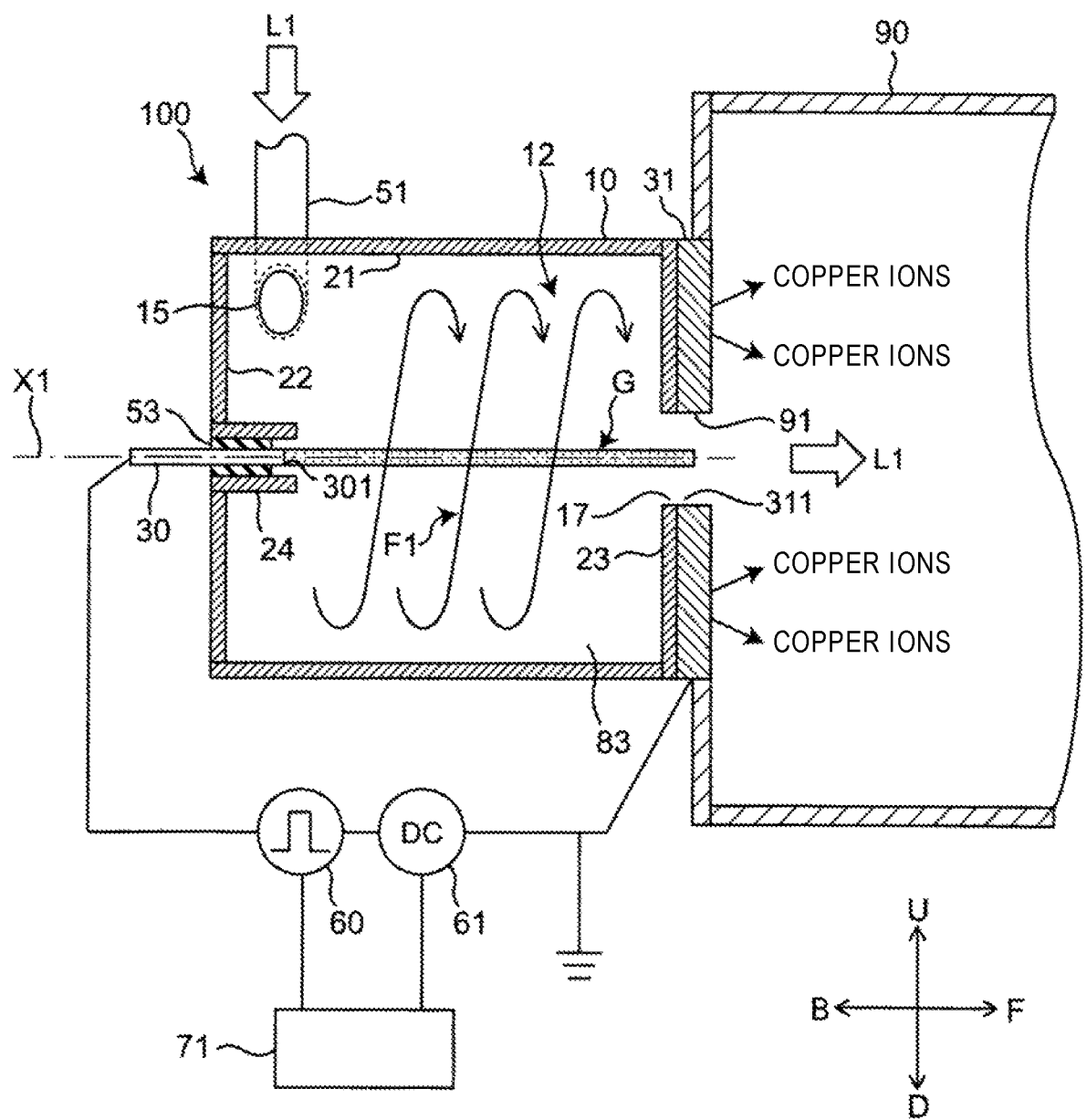
FIG. 5B is a side cross sectional view showing a swirl flow that has generated in the treatment vessel, along with metal ions generated by applying a negative voltage after stopping pulse voltage application.

For the purpose of explanation, the operation of the liquid treatment device 100 will be described for a state in which a gas phase G is generated in the treatment vessel 12 (FIG. 4), a state in which a plasma P is generated by applying a pulse voltage to the gas phase G from the pulse power supply (FIG. 5A), and a state in which a negative DC voltage is applied after the application of a pulse voltage by the pulse power supply 60 (FIG. 5B). FIG. 4 is a side cross sectional view showing a swirl flow F1 that has generated inside the treatment vessel 12, in the absence of an applied pulse voltage.

As shown in FIG. 4, a liquid (for example, water) L1 is introduced into the treatment vessel 12 through the inlet portion 15 under a predetermined pressure, specifically, under the pressure of a pump, or under the pressure of running water in the case of using tap water instead of a pump. In response, the liquid L1 moves toward the right-hand side of FIG. 4 from the inlet portion 15 as it generates a swirl flow F1 along the first inner wall 21. The swirl flow F1 traveling rightward in FIG. 4 in a swirl pattern is directed toward the ejecting section 17.

By the presence of the swirl flow F1, the pressure around the central axis X1 drops below the saturated water vapor pressure, and the liquid L1 partially vaporizes, and generates a gas phase G in the vicinity of the central axis X1. The gas phase G occurs around the swirl axis, specifically, along the central axis X1 from a right end portion 301 of the first electrode 30 of FIG. 4 to regions near the second electrode 31. The gas phase G is in contact with the swirl flow F1, and swirls with the swirl flow F1 in the same direction. In the vicinity of the ejecting section 17, the swirling gas phase G experiences resistance from the treated liquid L2 present in the reservoir 90, and is sheared into microbubbles or nanobubbles. These bubbles diffuse into the reservoir 90 through the ejecting section 17, and through the intake opening 91 connected to the ejecting section 17.

FIG. 5A is a side cross sectional view showing a state in which the pulse power supply 60 has applied a pulse voltage between the first electrode 30 and the second electrode 31 in the presence of the swirl flow F1 generated inside the treatment vessel 12 as shown in FIG. 4. As shown in FIG. 5A, the pulse power supply 60 applies a high pulse-voltage between the first electrode 30 and the second electrode 31 with the gas phase G being present over the region from the first electrode 30 to the second electrode 31 after the vaporization of the liquid L1. Applying a high pulse-voltage between the first electrode 30 and the second electrode 31 generates a plasma in the gas phase G, and this produces radicals (e.g., OH radicals) or ions. The radicals or ions dissolve into the swirl flow F1 from the gas phase G, and decompose the contaminants dissolving in the liquid L1. The plasma P in the gas phase G near the ejecting section 17 experiences resistance from the treated liquid L2 present in the reservoir 90, and this produces a large quantity of bubbles B containing OH radicals or other species. The liquid L2 treated by the OH radicals and other chemical species generated by plasma P is ejected into the reservoir 90 through the ejecting section 17 with bubbles B containing OH radicals and other species. That is, the OH radicals and other chemical species generated by plasma P dissolve into the treated liquid L2 in the reservoir 90 either directly or through bubbles B. After a lapse of a predetermined time period, the treated liquid L2 in the reservoir 90 turns into relatively stable hydrogen peroxide. The plasma P generated in response to high pulse-voltage application becomes extinguished upon ending voltage application.

The plasma generates ultraviolet (UV) light as it discharges. The generated UV light can decompose and sterilize contaminants or microorganisms upon falling on these substances. The UV light also generates OH radicals upon falling on the hydrogen peroxide water generated in the treated liquid, and the contaminants and microorganisms can be decomposed and sterilized also by these OH radicals.

Ending the voltage application from the pulse power supply 60 under the control of the control unit 71 creates a state where a negative DC voltage is applied between the first electrode 30 and the second electrode 31 from the DC power supply 61, as shown in FIG. 5B. Here, the second electrode 31 is at GND potential, and the first electrode 30 is at a negative voltage of about −1 to −100 V. That is, the second electrode 31 serves as an anode, and the first electrode 30 serves as a cathode. Because the plate-like second electrode 31 is made of copper or iron-containing metal, electrolysis occurs, and metal ions dissolve out of the second electrode 31 into the treated liquid L2 in the reservoir 90. FIG. 5B shows an example in which the dissolving metal ions are copper ions.

Because the treated liquid L2 in the reservoir 90 is a mixture of hydrogen peroxide and copper or iron metal ions, the Fenton's reaction takes place, and OH radicals generate. The generated OH radicals can treat the liquid L1 through reaction with the organic materials and other substances contained in the liquid L1.

Figure 6:
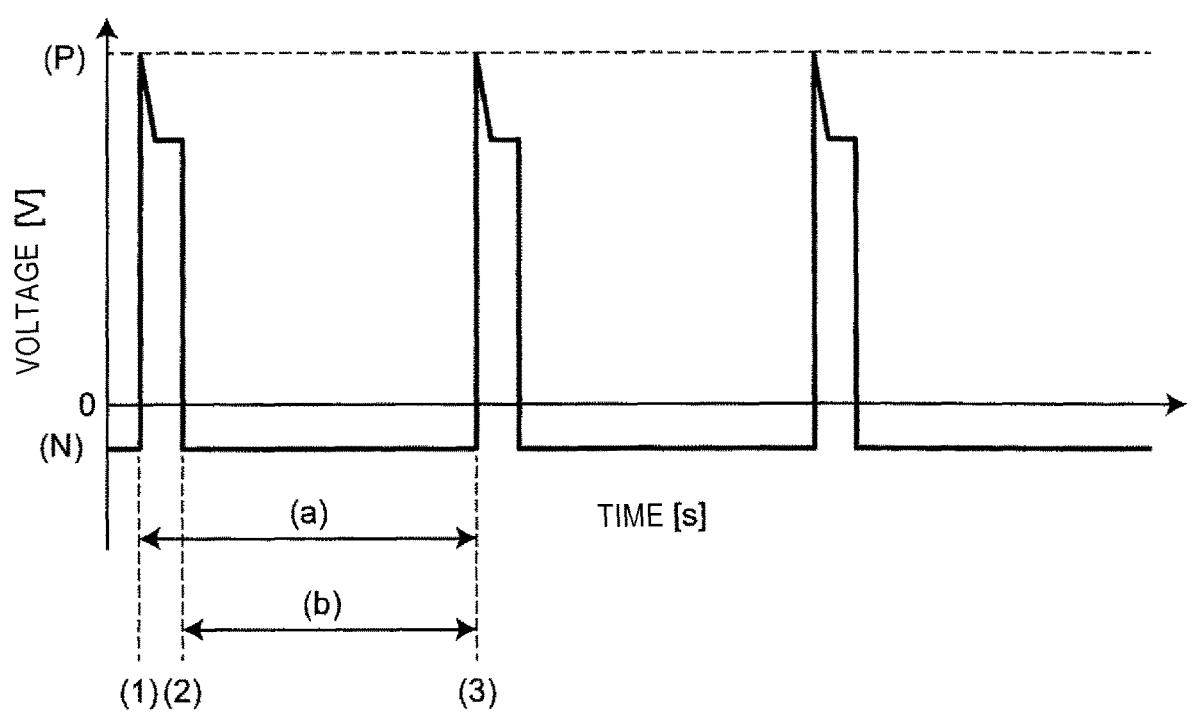
FIG. 6 is a diagram representing a timing chart of the voltage applied to the first electrode and the second electrode.

FIG. 6 is a timing chart representing the timing of voltage application by the pulse power supply 60 and the DC power supply 61 under the control of the control unit 71. First, under the control of the control unit 71, the pulse power supply 60 applies a pulse voltage to the gas phase G generated in the swirl flow F1, at timing (1) in FIG. 6. Electrical breakdown occurs when the voltage reaches the breakdown voltage (P), and the plasma P generates.

The plasma P becomes extinguished upon stopping the pulse voltage application from the pulse power supply 60 at timing (2) of FIG. 6 under the control of the control unit 71. Here, because the DC power supply 61 is applying a negative DC voltage, the voltage is not 0 V, but in a negative voltage applied state where a negative voltage (N) of about −1 to −100 V is applied. The pulse power supply 60 starts another pulse voltage application at timing (3) of FIG. 6.

The liquid L1 can be continuously treated by repeating the high voltage pulse application (on and off) from the pulse power supply 60, and the negative voltage application from the DC power supply 61 under the control of the control unit 71. The amount of current flow during the discharge increases when the applied pulse voltage has a large pulse width. This causes a severe electrode wear, and a large heat loss. It is accordingly desirable that the applied pulse voltage have a short pulse width. However, electrical breakdown does not occur, and the plasma P fails to generate when the pulse width is too short, specifically, when it is 100 ns or less. In order to ensure electrical breakdown, a pulse width of more than 100 ns is desirable. In order to reduce electrode wear and heat loss, a pulse width of less than 3 μs is desirable. Taken together, it is desirable that the pulse width be more than 100 ns and less than 3 μs.

The hydrogen peroxide concentration is dependant on the cycle (a) of applied pulse voltage. More hydrogen peroxide generates as the cycle (a) becomes shorter, and the amount of generated hydrogen peroxide decreases as the cycle (a) increases. The concentration of dissolved metal ions is dependent on the product of the absolute value of the negative voltage (N) supplied from the negative DC power supply 61, and the negative voltage application time (b) during which the negative voltage (N) is applied. For example, the metal ion concentration increases more when the applied negative voltage is −10 V than when it is −5 V. The metal ion concentration also increases as the negative voltage application time (b) increases.

That is, the amount of generated hydrogen peroxide, and the concentration of metal ions in the treated liquid L2 in the reservoir 90 can be controlled by separate control factors, and these may be set according to the purpose of liquid treatment.

In the embodiment described above, the plate-like second electrode 31 can serve as an anode, and generate metal ions upon applying a negative voltage between the first electrode 30 and the second electrode 31 from the DC power supply 61. Here, for example, because the metal ions generate by dissolving out of the plate-like second electrode 31 through electrolysis, the rod-like first electrode 30 can be prevented from wear, and the plasma P can efficiently generate for the treatment of liquid L1 while improving the performance of liquid treatment by taking advantage of the Fenton's reaction. The plasma P also can be stably generated for a prolonged time period, and the system can operate for extended time periods. Because there is no need to vaporize liquid by voltage application, plasma P can be generated with less power, and the liquid L1 can be treated efficiently. In other words, because the plasma P is generated by vaporizing liquid L1 in the swirl flow F1, and applying a pulse voltage from the pulse power supply 60 to the generated gas phase G, the efficiency of plasma P generation improves, and the liquid L1 can be treated in a shorter time period. The negative voltage application from the DC power supply 61 enables copper or iron ions to dissolve out from the second electrode 31, and the liquid can be efficiently treated by causing a Fenton's reaction with the hydrogen peroxide generated by plasma P.

Figure 7:
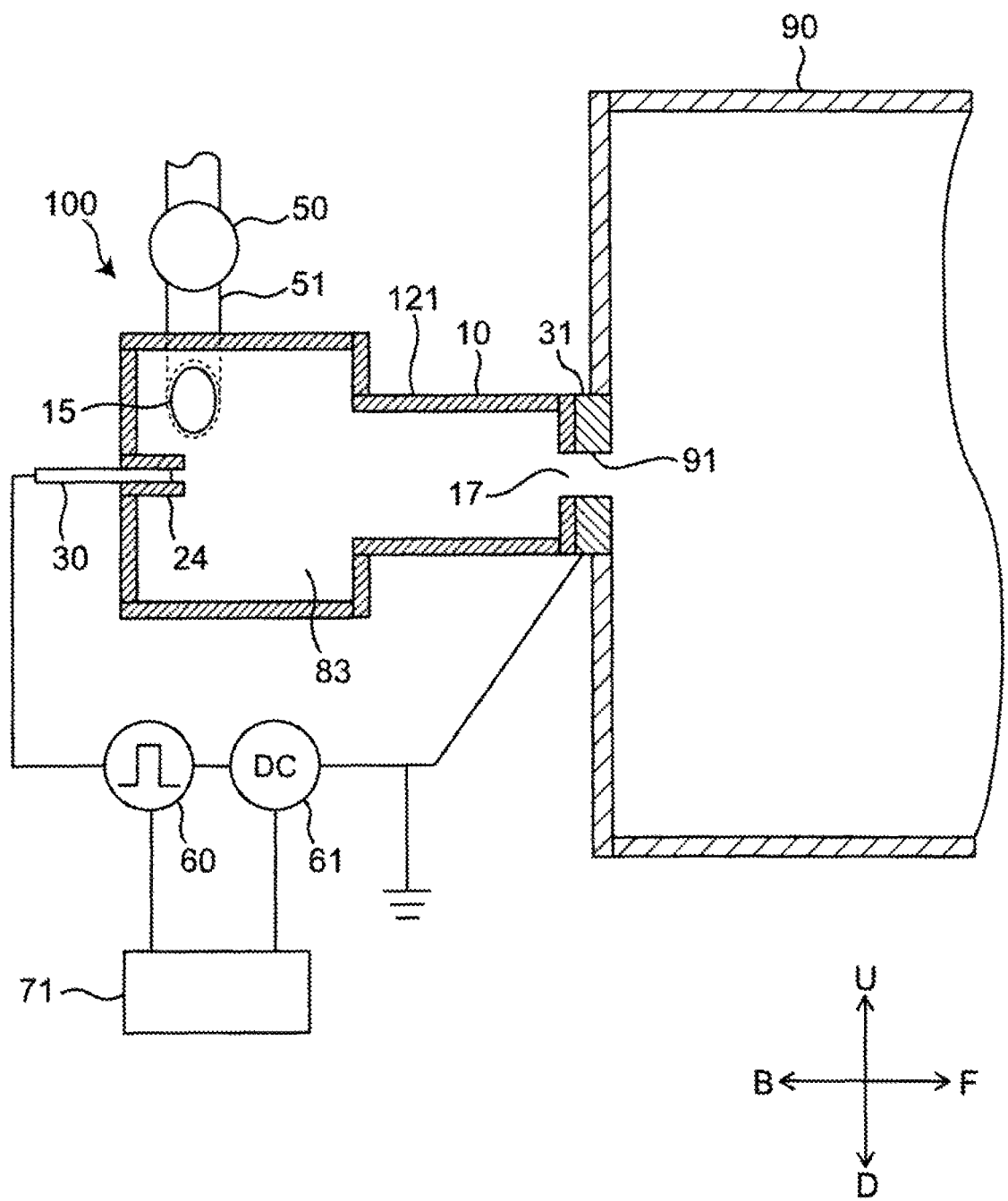
FIG. 7 is a diagram showing a treatment vessel combining cylinders of different radii.
Figure 8:
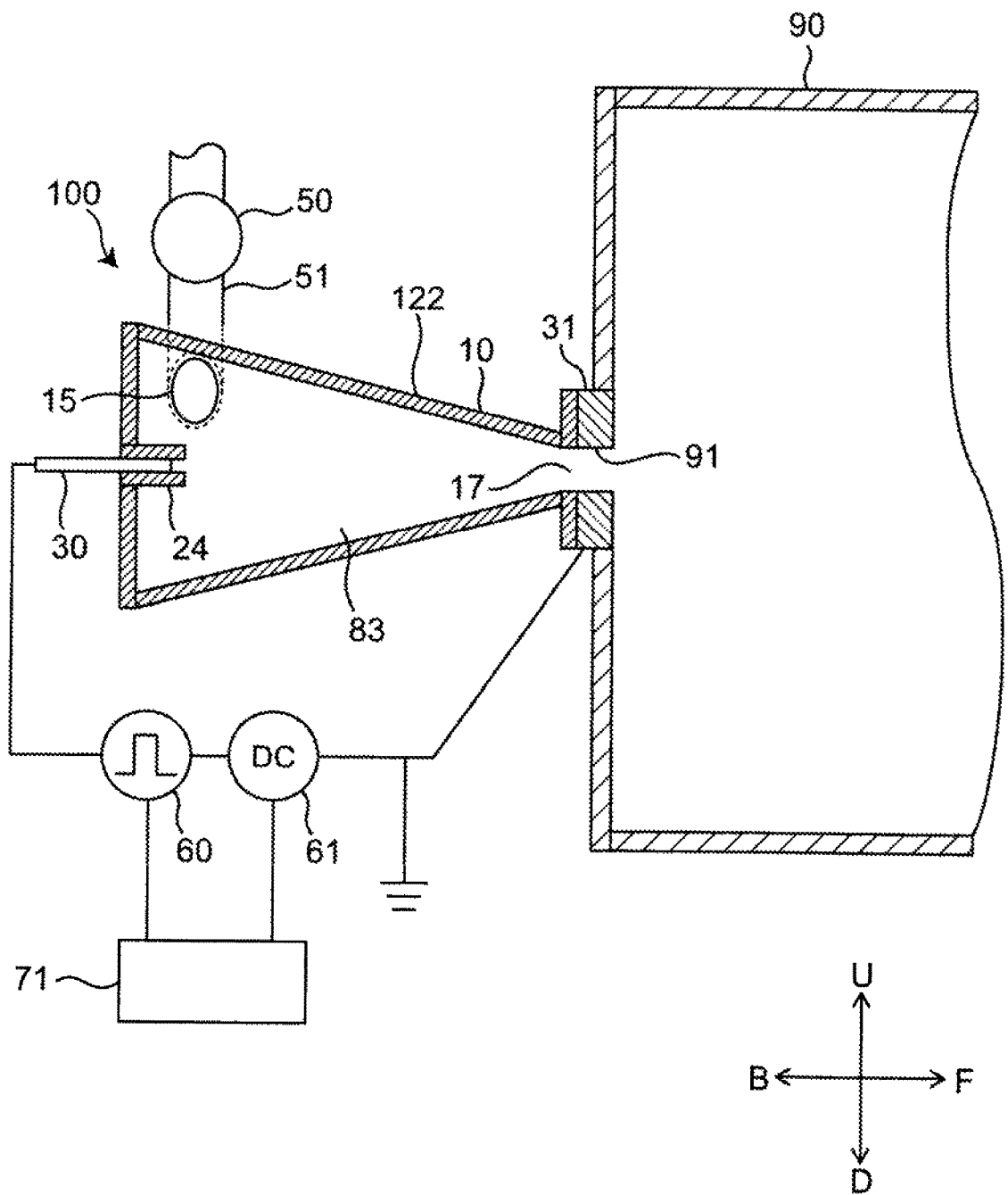
FIG. 8 is a diagram showing a treatment vessel having a circular cone shape.

In the foregoing descriptions, the treatment vessel 12 is described as a vessel of a simple cylindrical shape. However, the treatment vessel 12 may have a variety of other shapes, provided that it is a cylindrical vessel with a circular cross section and a closed end. For example, the same effects can be obtained with a treatment vessel 121 that combines cylinders of different radii as shown in FIG. 7, or with a treatment vessel 122 having a circular cone shape as shown in FIG. 8.

Variation

In the embodiment described above, the pulse power supply 60 applies a pulse voltage in a certain cycle previously set to achieve the desired treatment performance, and the voltage applied by the DC power supply 61 is constant. However, a more effective liquid treatment is possible when the frequency of applied pulse voltage, and the negative voltage value are varied according to the measured values of hydrogen peroxide concentration and metal ion concentration in the liquid to be treated L3.

Figure 9:
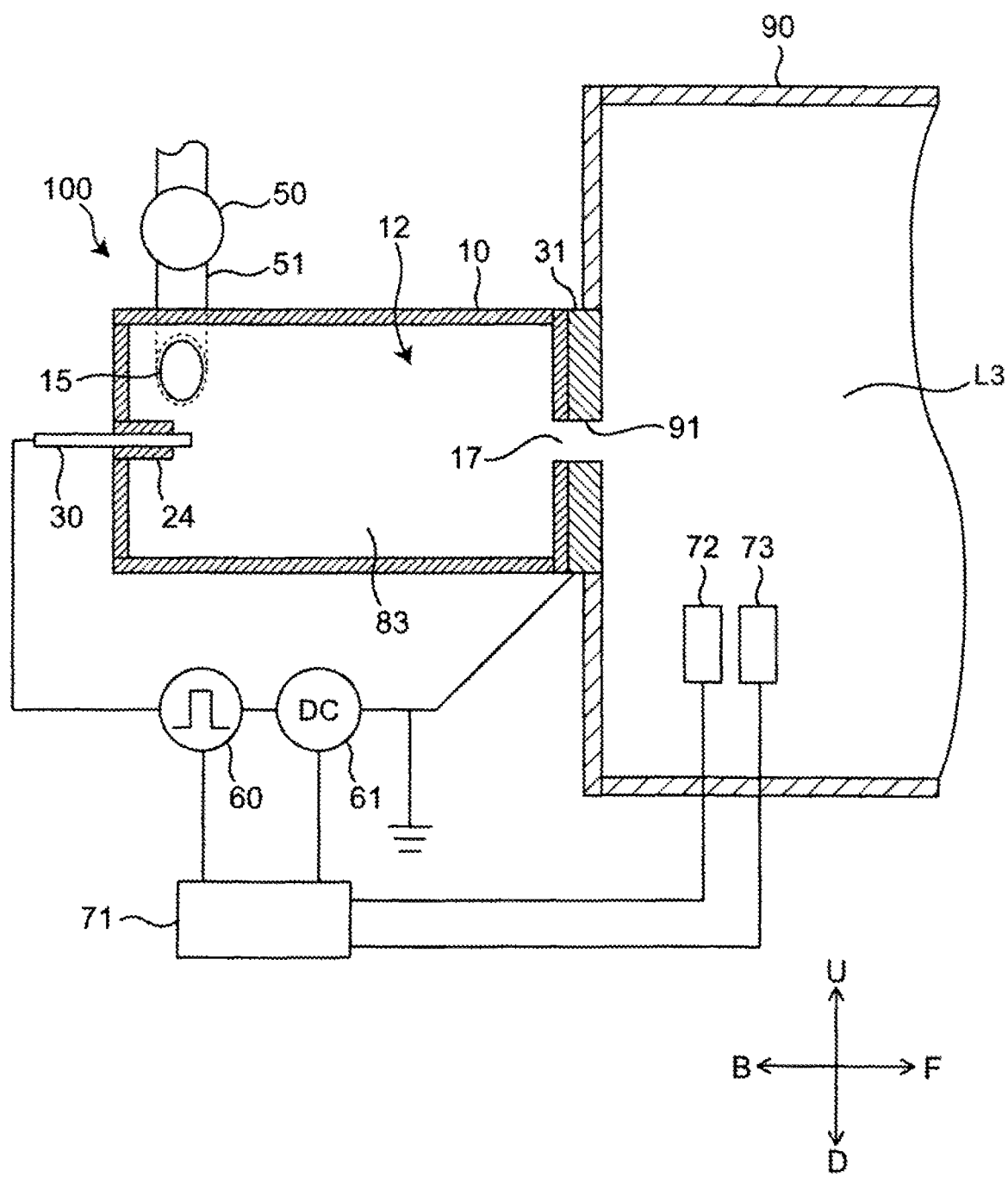
FIG. 9 is a side cross sectional view representing a variation of the embodiment of the present disclosure.
Figure 10:
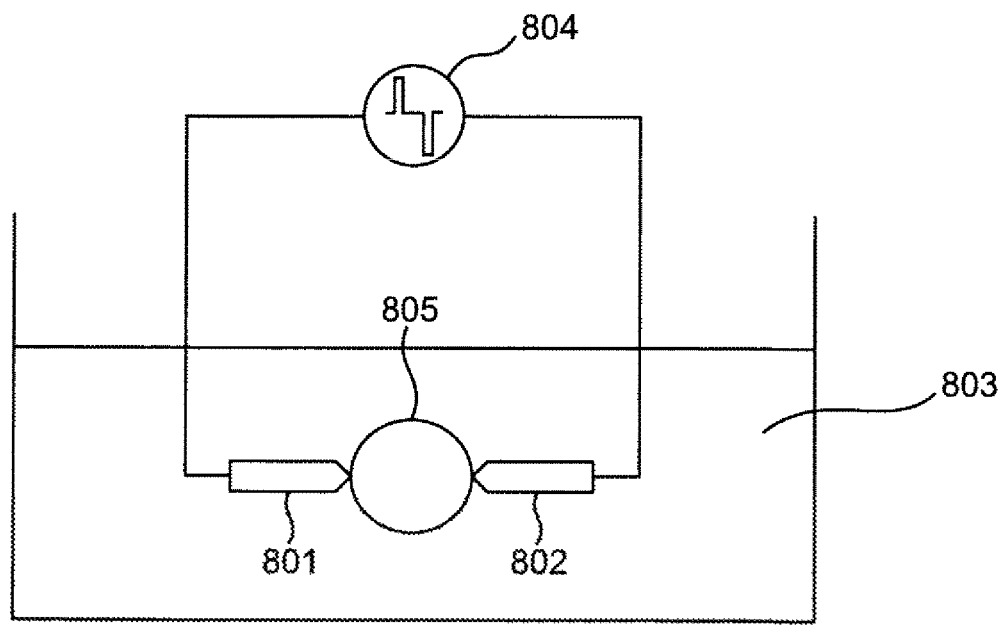
FIG. 10 is a cross sectional view of a traditional liquid treatment device.
Figure 11:
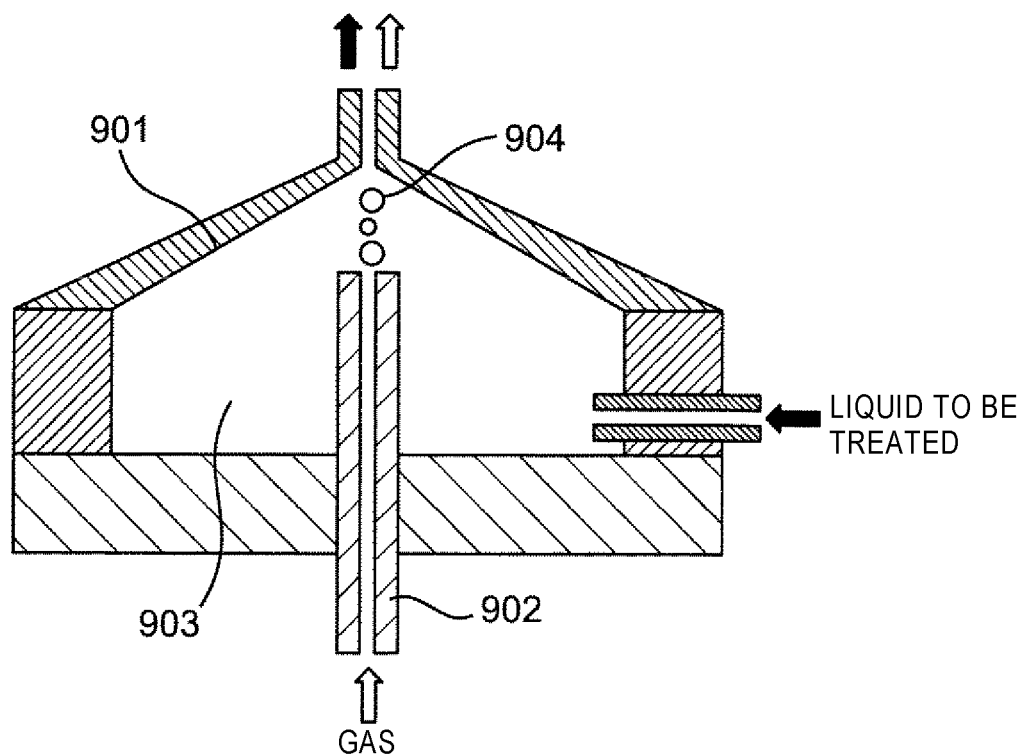
FIG. 11 is a cross sectional view of a traditional liquid treatment device provided with a gas introducing unit.
Figure 12:
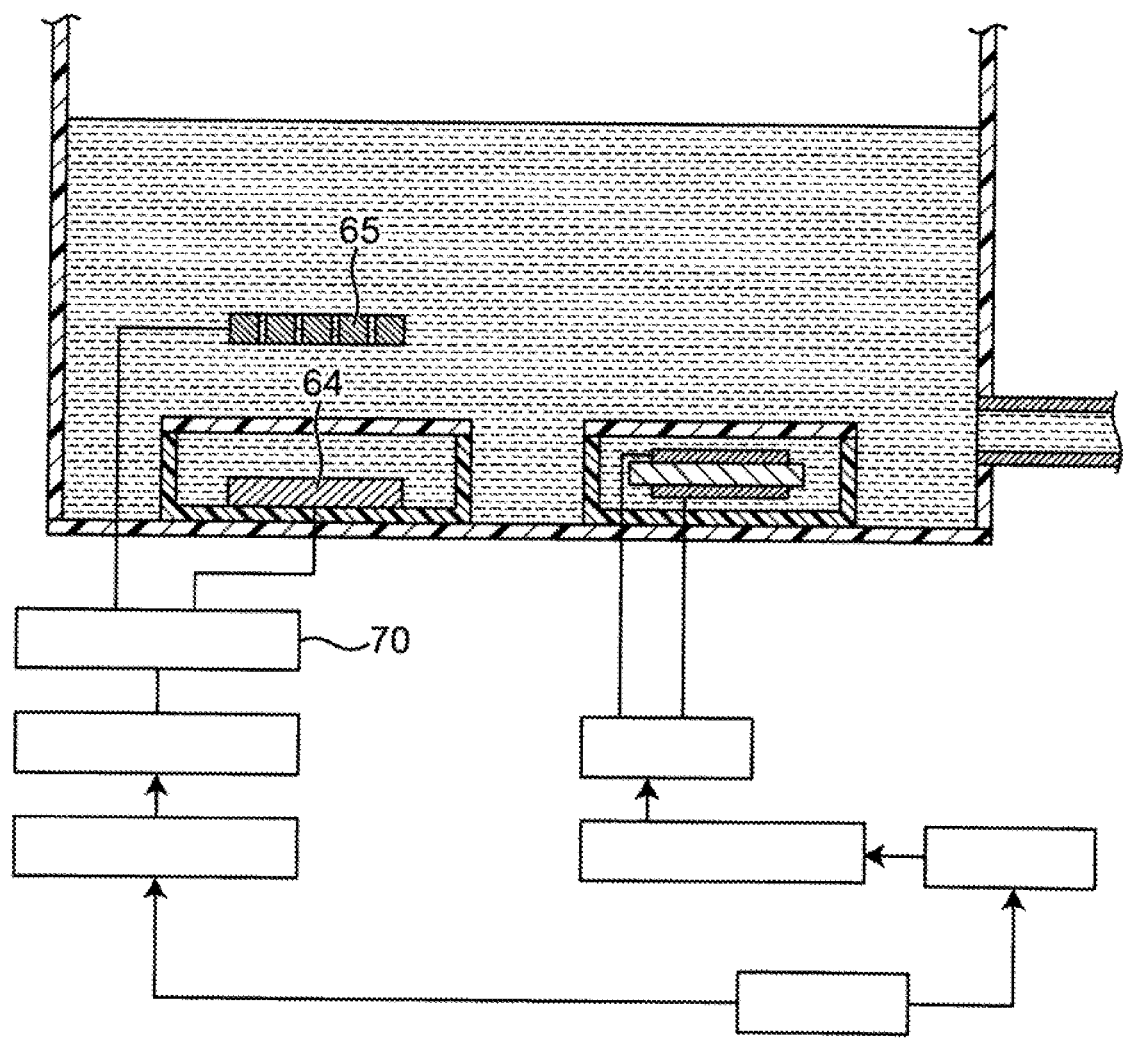
FIG. 12 is a cross sectional view of a liquid treatment device using the Fenton's reaction to improve its treatment performance.

FIG. 9 shows a device configuration according to a variation of the present disclosure. A metal ion concentration meter 72 is provided in the reservoir 90 that receives the ejected treated liquid L2. The metal ion concentration meter 72 measures the concentration of copper or iron ions in the liquid to be treated L3 inside the reservoir 90. A hydrogen peroxide concentration meter 73 is also provided in the reservoir 90, and measures the concentration of hydrogen peroxide in the liquid to be treated L3 inside the reservoir 90. The cycle of pulse voltage application by the pulse power supply 60, and the voltage supplied by the DC power supply 61 can be controlled by the control unit 71 according to the measured values from the metal ion concentration meter 72 and the hydrogen peroxide concentration meter 73. As an example, the control unit 71 controls these parameters using a relational table created by storing the measured cycle and voltage values from the metal ion concentration meter 72 and the hydrogen peroxide concentration meter 73.

In the device of FIG. 9, the metal ion concentration keeps increasing as the DC power supply 61 continuously applies a negative voltage. As shown in the formulae (1) to (4) describing the Fenton's reaction, copper and iron ions undergo catalytic reaction, and the Fenton's reaction in the reservoir 90 only requires a desired concentration of metal ions, and does not require a continuous supply of metal ions. As such, dissolving of metal ions can be stopped by setting a zero voltage for the voltage supplied by the DC power supply 61 when the control unit 71 determines in its control that the measured value from the metal ion concentration meter 72 has reached a preset upper-limit metal ion concentration. In the process of a continuous Fenton's reaction, the metal ions form hydroxide compounds, and precipitate in the form of a metal sludge. This causes a concentration drop in the metal ions contained in the liquid to be treated L3 inside the reservoir 90. However, the metal ion concentration in the reservoir 90 can be maintained in a certain concentration range under the control that instructs the DC power supply 61 to reapply a negative voltage when the control unit 71 under its control determines that the measured value from the metal ion concentration meter 72 has reached a preset lower-limit metal ion concentration. The upper-limit metal ion concentration is a preset value based on, for example, the quality standards for ejected liquid. The lower-limit metal ion concentration is a preset value based on, for example, the necessary capacity for the treatment of the liquid to be treated.

The hydrogen peroxide is consumed only in the process of Fenton's reaction. However, when the amount of hydrogen peroxide generated by plasma P exceeds the amount of hydrogen peroxide consumed in the Fenton's reaction, the hydrogen peroxide concentration in the liquid to be treated L3 keeps increasing in the reservoir 90. If the liquid treatment leaves a high hydrogen peroxide concentration in the treated liquid L2, additional steps of removing the hydrogen peroxide would be needed after the treatment of the liquid to be treated L3. The amount of hydrogen peroxide generated by plasma P can be reduced when the control unit 71 is adapted to stop the pulse voltage application from the pulse power supply 60, or to make the cycle of pulse voltage application shorter than the pre-adjusted cycle upon determining that the measured value from the hydrogen peroxide concentration meter 73 has reached a preset upper-limit hydrogen peroxide concentration. The concentration of hydrogen peroxide in the treated liquid L2 can be maintained in a certain concentration range in the reservoir 90 when the control unit 71 is adapted to instruct the pulse power supply 60 to apply a pulse voltage in a longer cycle than the pre-adjusted cycle upon determining that the measured value from the hydrogen peroxide concentration meter 73 has reached a preset lower-limit hydrogen peroxide concentration as a result of the hydrogen peroxide being consumed in the Fenton's reaction. The upper-limit hydrogen peroxide concentration is a preset value based on, for example, the quality standards for ejected liquid. The lower-limit hydrogen peroxide concentration is a preset value based on, for example, the necessary capacity for the treatment of the liquid to be treated.

In the variation of the embodiment described above, the hydrogen peroxide concentration and the metal ion concentration in the liquid to be treated L3 are measured in the reservoir 90, and the frequency of applied pulse voltage, and the negative voltage value are varied according to the measured values. In this way, the concentrations of the hydrogen peroxide and the metal ions contained in the liquid to be treated L3 in the reservoir 90 can be maintained in certain concentration ranges, and the liquid can be more effectively treated.

While there have been described a certain embodiment and a variation of the present disclosure, the embodiment and the variation described above are merely examples of implementations of the present disclosure. Accordingly, the present disclosure is not limited to the foregoing embodiment and variation, and the foregoing embodiment and variation may be modified as appropriate within the gist of the present disclosure. For example, the foregoing embodiments and variations can exhibit their effects even when any of the embodiments or variations is appropriately combined with another embodiment or variation. It is also possible to combine different embodiments or different examples, or combine embodiments and examples. The features of different embodiments or examples also may be combined.

The liquid treatment device according to the aspect of the present disclosure treats liquid with a plasma generated in the liquid, whereby contaminants and microorganisms contained in the liquid are decomposed and sterilized by the plasma directly contacting these substances, and simultaneously by the UV light and radicals generated by plasma discharge. In the liquid treatment device according to the aspect of the present disclosure, a Fenton's reaction simultaneously takes place as the hydrogen peroxide generated from plasma reacts with the copper or iron ions generated by electrolysis. This enables a more efficient liquid treatment, making the liquid treatment device applicable to a wide range of environment improvements, such as sterilization and deodorizing.

What is claimed is:

1. A liquid treatment device comprising:
a cylindrical treatment vessel having a circular cross section and a closed end;
a rod-shaped first electrode disposed at a first end on a central axis of the treatment vessel;
a second electrode made of a metal containing copper or iron and disposed at a second end of the treatment vessel;
a pulse power supply that applies a positive pulse voltage between the first electrode and the second electrode with the first electrode serving as an anode;
a DC power supply that applies a negative voltage between the first electrode and the second electrode with the second electrode serving as an anode; and
a liquid inlet through which liquid is introduced in a tangential direction of the circular cylindrical shape of the treatment vessel, and that causes the liquid to swirl in the treatment vessel and generate a gas phase in a swirl flow of the liquid.

2. The liquid treatment device according to claim 1, further comprising:
a hydrogen peroxide concentration meter connected to a second end side of the treatment vessel, and that measures a hydrogen peroxide concentration in a liquid to be treated inside a reservoir that stores a liquid treated in the treatment vessel and ejected into the reservoir;
a metal ion concentration meter that measures a metal ion concentration in the liquid to be treated inside the reservoir; and
a control unit that, according to measured values from the hydrogen peroxide concentration meter and the metal ion concentration meter, controls an operating frequency of the pulse power supply, and the voltage applied by the DC power supply.

3. The liquid treatment device according to claim 1, wherein the pulse voltage applied by the pulse power supply has a pulse width of more than 100 ns and less than 3 μs.

4. The liquid treatment device according to claim 2, wherein the pulse voltage applied by the pulse power supply has a pulse width of more than 100 ns and less than 3 μs.

5. The liquid treatment device according to claim 1, wherein the second electrode is a plate-shaped second electrode.

* * * * *